US008341941B2

(12) United States Patent
Asanuma et al.

(10) Patent No.: US 8,341,941 B2
(45) Date of Patent: Jan. 1, 2013

(54) EXHAUST PURIFICATION DEVICE OF INTERNAL COMBUSTION ENGINE

(75) Inventors: Takamitsu Asanuma, Mishima (JP); Shinya Hirota, Susono (JP); Kohei Yoshida, Gotenba (JP); Hiromasa Nishioka, Susono (JP); Hiroshi Otsuki, Susono (JP); Tomihisa Oda, Numazu (JP); Shunsuke Toshioka, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 594 days.

(21) Appl. No.: 12/522,183

(22) PCT Filed: Jul. 2, 2008

(86) PCT No.: PCT/JP2008/062364
§ 371 (c)(1),
(2), (4) Date: Jul. 6, 2009

(87) PCT Pub. No.: WO2009/019951
PCT Pub. Date: Feb. 12, 2009

(65) Prior Publication Data
US 2010/0089039 A1   Apr. 15, 2010

(30) Foreign Application Priority Data

Aug. 8, 2007  (JP) ................................ 2007-207015

(51) Int. Cl.
*F01N 3/20*  (2006.01)
(52) U.S. Cl. ................ 60/286; 60/295; 60/297; 60/301; 60/303; 60/311
(58) Field of Classification Search .................... 60/276, 60/286, 295, 297, 301, 303, 311
See application file for complete search history.

(56) References Cited

U.S. PATENT DOCUMENTS

| | | | | |
|---|---|---|---|---|
| 5,388,406 | A * | 2/1995 | Takeshima et al. ............. | 60/297 |
| 6,182,443 | B1 | 2/2001 | Jarvis et al. | |
| 6,354,079 | B1 | 3/2002 | Choi et al. | |
| 2002/0152745 | A1* | 10/2002 | Patchett et al. ................. | 60/286 |
| 2005/0034450 | A1* | 2/2005 | Itoh et al. ........................ | 60/286 |
| 2006/0130458 | A1* | 6/2006 | Solbrig ........................... | 60/286 |
| 2006/0153761 | A1 | 7/2006 | Bandl-Konrad et al. | |
| 2006/0288689 | A1* | 12/2006 | Shimoda ........................ | 60/275 |

(Continued)

FOREIGN PATENT DOCUMENTS

JP          5 195755          8/1993

(Continued)

*Primary Examiner* — Kenneth Bomberg
*Assistant Examiner* — Jorge Leon, Jr.
(74) *Attorney, Agent, or Firm* — Oblon, Spivak, McClelland, Maier & Neustadt, L.L.P.

(57) ABSTRACT

In an internal combustion engine, an $NO_x$ selective reduction catalyst (14) is arranged in an engine exhaust passage, and an $NO_x$ storage catalyst (12) is arranged in the engine exhaust passage upstream of the $NO_x$ selective reduction catalyst (14). When the amount of $NO_x$ stored in the $NO_x$ storage catalyst (12) exceeds a predetermined allowable value, the $NO_x$ storage catalyst (12) is raised in temperature to make the $NO_x$ storage catalyst (12) release the $NO_x$. The amount of urea feed is decreased by exactly the amount of reduction of the calculated stored $NO_x$ amount with respect to the amount of urea feed determined from the engine operating state, and the amount of urea feed is increased by exactly the amount of reduction of the calculated released $NO_x$ amount with respect to the amount of urea feed determined from the engine operating state.

13 Claims, 7 Drawing Sheets

U.S. PATENT DOCUMENTS

2007/0056266 A1* 3/2007 Kurtz ............................. 60/279
2007/0089403 A1* 4/2007 Pfeifer et al. ................... 60/286

FOREIGN PATENT DOCUMENTS

| | | |
|---|---|---|
| JP | 11-81992 | 3/1999 |
| JP | 2000 230414 | 8/2000 |
| JP | 2000 265828 | 9/2000 |
| JP | 2001 193443 | 7/2001 |
| JP | 2003-269142 | 9/2003 |
| JP | 2003 286827 | 10/2003 |
| JP | 2005 2925 | 1/2005 |
| JP | 2006 512529 | 4/2006 |

* cited by examiner (A)

(B)

(C)

(A)

(B)

(A)

(B)

(C)

EXHAUST PURIFICATION DEVICE OF INTERNAL COMBUSTION ENGINE

TECHNICAL FIELD

The present invention relates to an exhaust purification device of an internal combustion engine.

BACKGROUND ART

Known in the art is an internal combustion engine arranging an $NO_x$ selective reduction catalyst in an engine exhaust passage, arranging an $NO_x$ storage catalyst storing $NO_x$ contained in the exhaust gas in the form of nitrates and releasing the stored $NO_x$ when feeding a reducing agent in the engine exhaust passage upstream of the $NO_x$ selective reduction catalyst, and feeding urea to the $NO_x$ selective reduction catalyst and using the ammonia generated from the urea to selectively reduce the $NO_x$ contained in the exhaust gas (for example, see Japanese Patent Publication (A) No. 2005-2925). In this internal combustion engine, the amount of urea feed is determined considering the $NO_x$ amount stored in the $NO_x$ storage catalyst and the $NO_x$ amount released from the $NO_x$ storage catalyst. For example, when the $NO_x$ storage catalyst releases the $NO_x$, the amount of urea feed is increased by exactly the amount of reduction of the $NO_x$ amount released.

However, in this internal combustion engine, when feeding the reducing agent, that is, the fuel, for releasing the $NO_x$ from the $NO_x$ storage catalyst, part of the stored $NO_x$ is released in the form of NO or $NO_2$ from the $NO_x$ storage catalyst, but part of the stored $NO_x$ is further reduced more than NO and is released in the form of ammonia $NH_3$. In this case, it is not clear to what extent the stored $NO_x$ is released in the form of $NO_x$ and to what extent it is released in the form of ammonia $NH_3$. In this case, if the amount released in the form of ammonia $NH_3$ is large, the released $NO_x$ is reduced by this ammonia $NH_3$, so it is no longer necessary to increase the amount of urea feed.

In this regard, the above-mentioned internal combustion engine is predicated on all of the stored $NO_x$ being released in the form of $NO_x$. Therefore, there is the problem that since the amount of urea feed is increased by exactly the amount of reduction of the $NO_x$ amount released, the amount of urea feed ends up becoming excessive. Such a problem occurs as long as a reducing agent is used to make the $NO_x$ storage catalyst release $NO_x$.

DISCLOSURE OF THE INVENTION

An object of the present invention is to provide an exhaust purification device of an internal combustion engine making $NO_x$ be released without feeding a reducing agent and thereby preventing the above problem from occurring.

According to the present invention, there is provided an exhaust purification device of an internal combustion engine arranging an $NO_x$ selective reduction catalyst in an engine exhaust passage, feeding urea into the $NO_x$ selective reduction catalyst, and using an ammonia generated from the urea to selectively reduce $NO_x$ contained in an exhaust gas, wherein an $NO_x$ storage catalyst is arranged inside the $NO_x$ engine exhaust passage upstream of the selective reduction catalyst, the $NO_x$ storage catalyst having a property of storing $NO_x$ contained in the exhaust gas or releasing stored $NO_x$ in accordance with the temperature of the $NO_x$ storage catalyst, an amount of $NO_x$ stored in the $NO_x$ storage catalyst and an amount of $NO_x$ released from the $NO_x$ storage catalyst is calculated, a temperature of the $NO_x$ storage catalyst is raised to make the $NO_x$ storage catalyst release $NO_x$ when a calculated $NO_x$ amount stored exceeds a predetermined allowable value, an amount of urea feed is reduced by exactly a calculated amount of reduction of the stored $NO_x$ amount with respect to an amount of urea feed determined from an engine operating state, and the amount of urea feed is increased by exactly a calculated amount of reduction of the released $NO_x$ amount with respect to the amount of urea feed determined from the engine operating state.

That is, in the present invention, what is released from the $NO_x$ storage catalyst is NO or $NO_2$. Ammonia $NH_3$ is not released. Further, if forcibly making the $NO_x$ storage catalyst rise in temperature, the $NO_x$ will be released in a respectable amount in a short time. Due to this, it becomes possible to accurately find the amount of $NO_x$ released per unit time. Therefore, it is possible to accurately calculate the amount of urea feed required for reduction of $NO_x$.

BEST MODE FOR CARRYING OUT THE INVENTION

Figure 1:
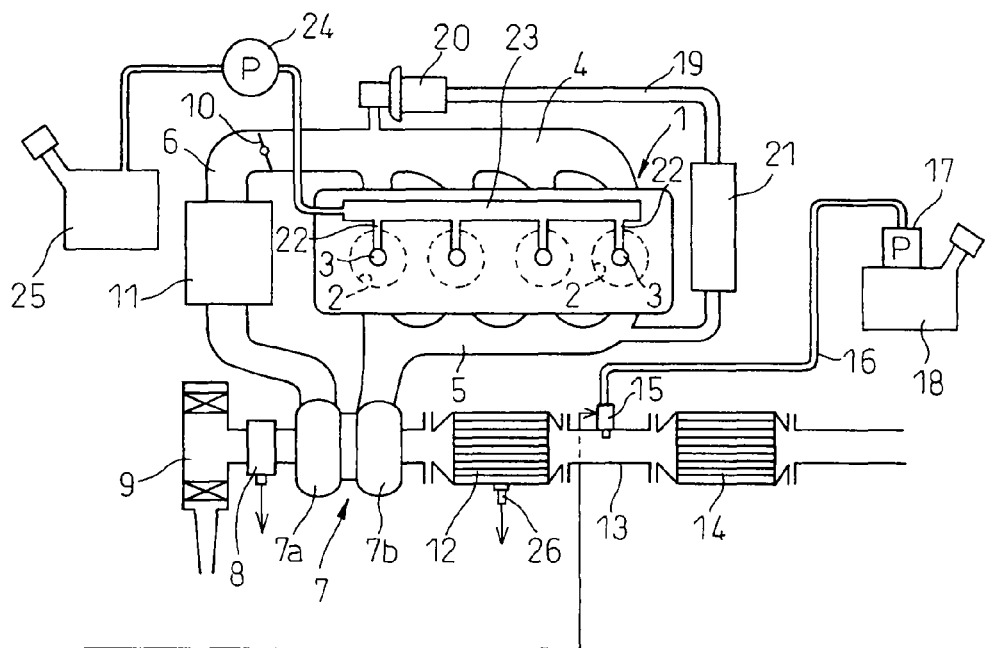
FIG. 1 is an overview of a compression ignition type internal combustion engine.
Figure 1:
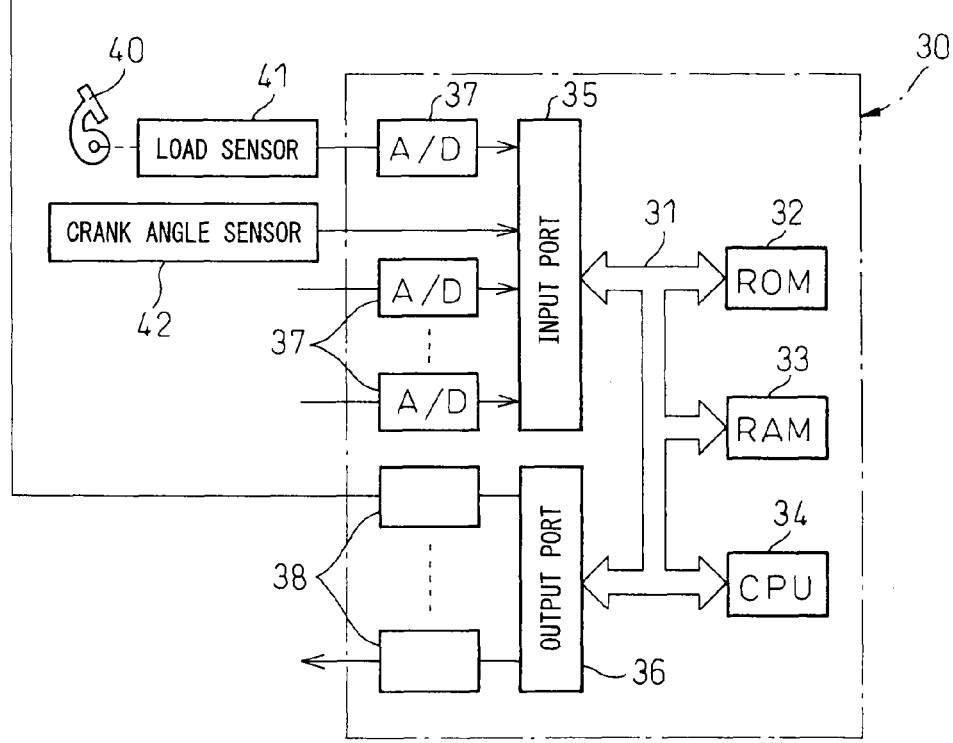

FIG. 1 shows an overview of a compression ignition type internal combustion engine.

Referring to FIG. 1, 1 indicates an engine body, 2 a combustion chamber of a cylinder, 3 an electronic control type fuel injector for injecting fuel into each combustion chamber 2, 4 an intake manifold, and 5 an exhaust manifold. The intake manifold 4 is connected through an intake duct 6 to the outlet of a compressor 7a of an exhaust turbocharger 7, while the inlet of the compressor 7a is connected through an intake air amount detector 8 to an air cleaner 9. Inside the intake duct 6, a throttle valve 10 driven by a step motor is arranged. Further, around the intake duct 6, a cooling device 11 for cooling the intake air flowing through the inside of the intake duct 6 is arranged. In the embodiment shown in FIG. 1, the engine cooling water is guided to the cooling device 11 where the engine cooling water cools the intake air.

On the other hand, the exhaust manifold 5 is connected to the inlet of the exhaust turbine 7b of the exhaust turbocharger 7, while the outlet of the exhaust turbine 7b is connected to the inlet of a $NO_x$ storage catalyst 12. The outlet of the $NO_x$ storage catalyst 12 is connected to a $NO_x$ selective reduction catalyst 14 via an exhaust pipe 13. The $NO_x$ selective reduction catalyst 14 is comprised of an ammonia adsorption type of Fe zeolite having a high $NO_x$ purification rate at low temperatures or comprised of a titania vanadium based catalyst having no ammonia adsorption function.

Inside an exhaust pipe 13 upstream of the $NO_x$ selective reduction catalyst 14, an aqueous urea solution feed valve 15 is arranged. This aqueous urea solution feed valve 15 is connected through a feed pipe 16 and a feed pump 17 to an aqueous urea solution tank 18. The aqueous urea solution stored inside the aqueous urea solution tank 18 is injected by the feed pump 17 into the exhaust gas flowing within the exhaust pipe 13 from the aqueous urea solution feed valve 15, while the ammonia $((NH_2)_2CO+H_2O \rightarrow 2NH_3+CO_2)$ generated from urea causes the $NO_x$ contained in the exhaust gas to be reduced in the $NO_x$ selective reduction catalyst 14.

The exhaust manifold 5 and the intake manifold 4 are connected to each other through an exhaust gas recirculation (hereinafter referred to as the "EGR") passage 19. Inside the EGR passage 19 is arranged an electronic control type EGR control valve 20. Further, around the EGR passage 19 is arranged a cooling device 21 for cooling the EGR gas flowing through the inside of the EGR passage 19. In the embodiment shown in FIG. 1, the engine cooling water is guided through the cooling device 21, where the engine cooling water is used to cool the EGR gas. On the other hand, each fuel injector 3 is connected through a fuel feed pipe 22 to a common rail 23. This common rail 23 is connected through an electronically controlled variable discharge fuel pump 24 to a fuel tank 25. The fuel stored in the fuel tank 25 is fed by the fuel pump 24 into the common rail 23, and the fuel fed to the inside of the common rail 23 is fed through each fuel pipe 22 to the fuel injectors 3.

An electronic control unit 30 is comprised of a digital computer provided with a ROM (read only memory) 32, RAM (random access memory) 33, CPU (microprocessor) 34, input port 35, and output port 36 all connected to each other by a bi-directional bus 31. A temperature sensor 26 for detecting the bed temperature of the $NO_x$ storage catalyst 12 is attached to the $NO_x$ storage catalyst 12, and the output signals of the temperature sensor 26 and intake air amount detector 8 are input through corresponding AD converters 37 into the input port 35.

On the other hand, the accelerator pedal 40 has a load sensor 41 generating an output voltage proportional to the amount of depression L of the accelerator pedal 40 connected to it. The output voltage of the load sensor 41 is input through a corresponding AD converter 37 to the input port 35. Further, the input port 35 has a crank angle sensor 42 generating an output pulse each time the crank shaft rotates by for example 15° C. connected to it. On the other hand, the output port 36 is connected through corresponding drive circuits 38 to the fuel injectors 3, throttle valve 10 drive step motor, aqueous urea solution feed valve 15, feed pump 17, EGR control valve 20, and fuel pump 24.

The $NO_x$ storage catalyst 12 may be a type of catalyst absorbing the $NO_x$ in exhaust gas or a type of catalyst adsorbing the $NO_x$ in exhaust gas. In the type of $NO_x$ storage catalyst 12 absorbing the $NO_x$, the surface of the catalyst carrier carries a precious metal catalyst dispersed on it and the surface of the catalyst carrier is formed with a layer of an $NO_x$ absorbent. In this case, for example, platinum Pt is used as the precious metal catalyst. As the ingredient forming the $NO_x$ absorbent, at least one ingredient selected from potassium K, sodium Na, cesium Cs, or another such alkali metal, barium Ba, calcium Ca, or another alkaline earth metal, and lanthanum La, yttrium Y, or another rare earth metal may be used.

This $NO_x$ storage catalyst 12 has the function of absorbing $NO_x$ when the air-fuel ratio of the exhaust gas is lean and releasing the absorbed $NO_x$ when the air-fuel ratio of the exhaust gas becomes the stoichiometric air-fuel ratio or rich. In a compression ignition type internal combustion engine, the air-fuel ratio of the exhaust gas is lean. Therefore, usually part of the $NO_x$ contained in the exhaust gas is absorbed in the $NO_x$ storage catalyst 12.

In this regard, unless the $NO_x$ selective reduction catalyst 14 becomes substantially 200° C. or more, it will not be activated. Therefore, after engine startup, the $NO_x$ purification action by the $NO_x$ selective reduction catalyst 14 cannot be expected until the temperature of the $NO_x$ selective reduction catalyst 14 rises. In this regard, the $NO_x$ storage catalyst 12 has the ability to absorb the $NO_x$ in the exhaust gas even at the time of a low temperature where the $NO_x$ selective reduction catalyst 14 is not activated.

Therefore, as shown in FIG. 1, if the $NO_x$ storage catalyst 12 is arranged upstream of the $NO_x$ selective reduction catalyst 14, when the $NO_x$ selective reduction catalyst 14 is not activated, the $NO_x$ in the exhaust gas will be absorbed in the $NO_x$ storage catalyst 12 and therefore $NO_x$ will be kept from being released into the atmosphere.

On the other hand, when the $NO_x$ absorption ability of the $NO_x$ storage catalyst 12 ends up becoming saturated, the $NO_x$ storage catalyst 12 can no longer absorb $NO_x$. In this regard, in this case, if raising the temperature of the $NO_x$ storage catalyst 12, the absorbed $NO_x$ is released from the $NO_x$ storage catalyst 12. At this time, the $NO_x$ selective reduction catalyst 14 is also raised in temperature. Therefore, in the present invention, before the $NO_x$ absorption ability of the $NO_x$ storage catalyst 12 becomes saturated, the $NO_x$ storage catalyst 12 is raised in temperature to make the $NO_x$ storage catalyst 12 release $NO_x$ and to purify this released $NO_x$ in the $NO_x$ selective reduction catalyst 14.

Note that even when making the air-fuel ratio of the exhaust gas flowing into the $NO_x$ storage catalyst 12 rich, the $NO_x$ storage catalyst 12 releases $NO_x$. However, in this case, as explained above, part of the $NO_x$ is further reduced and released in the form of ammonia, so in the present invention, rather than making the air-fuel ratio of the exhaust gas rich to release the $NO_x$, the $NO_x$ storage catalyst 12 is raised in temperature to release the $NO_x$.

On the other hand, the same is true even in the case of using a type of catalyst adsorbing the $NO_x$ as a $NO_x$ storage catalyst 12. That is, the type of $NO_x$ storage catalyst 12 adsorbing $NO_x$ has a substrate made of cordierite or zeolite having a large number of pores. This substrate is for example formed with a layer of a catalyst carrier made of alumina. The catalyst carrier carries for example a precious metal catalyst such as platinum.

This $NO_x$ storage catalyst 12 increases in the adsorbable $NO_x$ amount the lower the temperature of the $NO_x$ storage catalyst 12. Therefore, in this case as well, when the $NO_x$ selective reduction catalyst 14 is not activated, the $NO_x$ in the exhaust gas is adsorbed at the $NO_x$ storage catalyst 12 and therefore $NO_x$ is kept from being released into the atmosphere. Furthermore, even in this $NO_x$ storage catalyst 12, if raising the temperature of the $NO_x$ storage catalyst 12, the adsorbed $NO_x$ is released from the $NO_x$ storage catalyst 12.

Therefore, even if using an $NO_x$ storage catalyst 12 of the type adsorbing $NO_x$, before the $NO_x$ adsorption ability of the $NO_x$ storage catalyst 12 becomes saturated, the $NO_x$ storage catalyst 12 is raised in temperature to make the $NO_x$ storage catalyst 12 release the $NO_x$ and this released $NO_x$ is purified at the $NO_x$ selective reduction catalyst 14.

Figure 2:
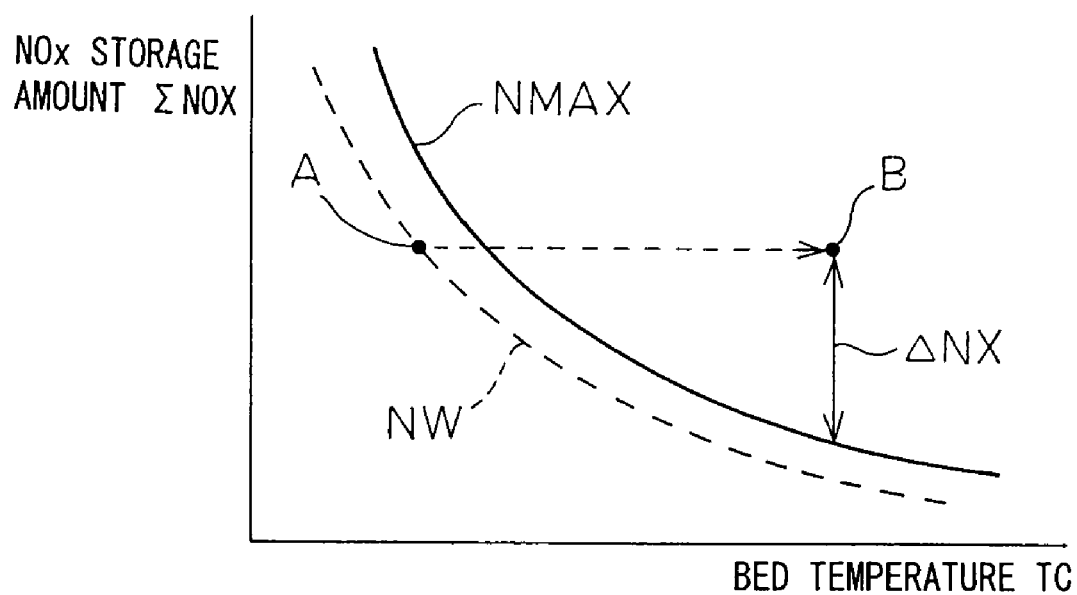
FIG. 2 is a view showing a maximum $NO_x$ storage amount NMAX of an $NO_x$ storage catalyst etc.

FIG. 2 shows the maximum storage amount NMAX of $NO_x$ which the $NO_x$ storage catalyst 12 can absorb or adsorb. Note that in FIG. 2, the ordinate shows the $NO_x$ storage amount $\Sigma NOX$ at the $NO_x$ storage catalyst 12, while the abscissa shows the bed temperature TC of the $NO_x$ storage catalyst 12. As shown in FIG. 2, the maximum $NO_x$ storage amount NMAX increases the lower the bed temperature TC of the $NO_x$ storage catalyst 12, therefore it is learned that the $NO_x$ storage catalyst 12 has the ability to absorb or adsorb a large amount of $NO_x$ when the bed temperature TC of the $NO_x$ storage catalyst 12 is low, for example, at the time of engine startup.

On the other hand, in the present invention, an allowable value NW of a slightly smaller $NO_x$ storage amount than the maximum $NO_x$ storage amount NMAX is determined in advance. When the $NO_x$ storage amount $\Sigma NOX$ exceeds this predetermined allowable value NW, the $NO_x$ storage catalyst 12 is raised in temperature to make the $NO_x$ storage catalyst 12 release the $NO_x$.

For example, when the $NO_x$ storage amount $\Sigma NOX$ reaches the point A in FIG. 2, the $NO_x$ storage catalyst 12 is raised in temperature. At this time, if the bed temperature TC rises to the temperature shown by the point B, at this time, the excess $NO_x$ storage amount $\Delta NX$ with respect to the maximum storage amount NMAX is released from the $NO_x$ storage catalyst 12.

Now, the $NO_x$ storage catalyst 12 generally speaking has the property of storing, that is, absorbing or adsorbing, $NO_x$ at the time of a low temperature and releasing $NO_x$ at the time of a high temperature. That is, the $NO_x$ storage catalyst 12 has the property of storing the $NO_x$ contained in the exhaust gas or releasing the stored $NO_x$ in accordance with the temperature of the $NO_x$ storage catalyst 12. Therefore, if assuming that an engine exhausts a fixed amount of $NO_x$, when the $NO_x$ is stored at the $NO_x$ storage catalyst 12, the amount of $NO_x$ in the exhaust gas flowing out from the $NO_x$ storage catalyst 12 decreases, while when the $NO_x$ is being released from the $NO_x$ storage catalyst 12, the amount of $NO_x$ in the exhaust gas flowing out from the $NO_x$ storage catalyst 12 increases.

In this case, the amount of urea required for reducing the $NO_x$ decreases the smaller the amount of $NO_x$ in the exhaust gas flowing out from the $NO_x$ storage catalyst 12 and increases the greater the amount of $NO_x$ in the exhaust gas flowing out from the $NO_x$ storage catalyst 12. On the other hand, if the engine operating state is determined, the amount of $NO_x$ exhausted from the engine is determined. Therefore, if the engine operating state is determined, the amount of urea feed required for reducing the $NO_x$ exhausted from the engine is determined. Therefore, in the present invention, the amount of $NO_x$ stored in the $NO_x$ storage catalyst 12 and the amount of $NO_x$ released from the $NO_x$ storage catalyst 12 are calculated, the amount of urea feed is reduced by exactly the amount of reduction of the calculated stored $NO_x$ amount with respect to the amount of urea feed determined by the engine operating state, and the amount of urea feed is increased by exactly the amount of reduction of the calculated released $NO_x$ amount with respect to the amount of urea feed determined by the engine operating state.

Figure 3:
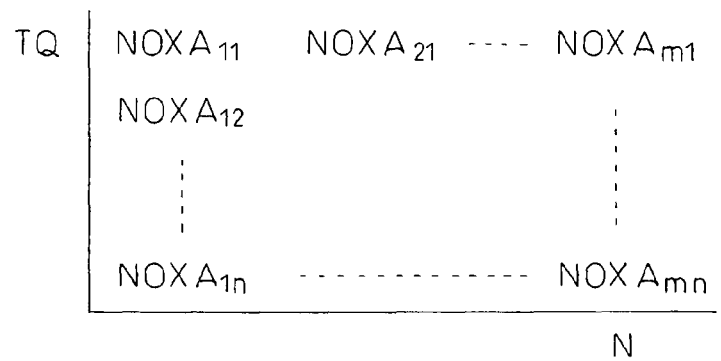
FIG. 3 is a view showing a map of the $NO_x$ amount NOXA exhausted from the engine etc.
Figure 3:
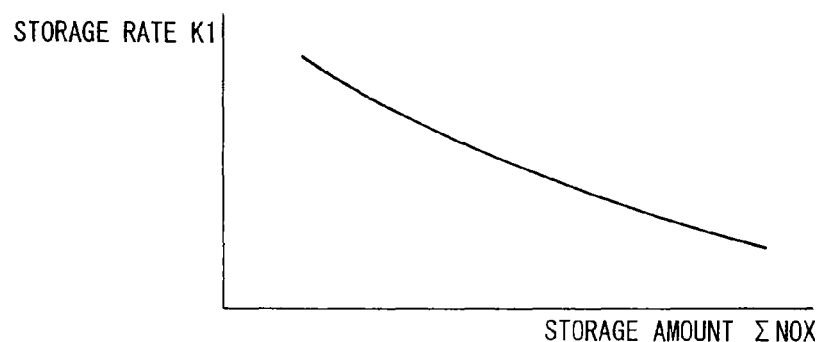
Figure 3:
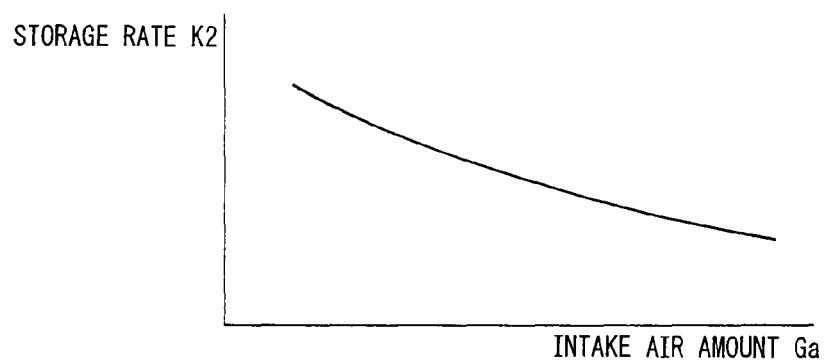
Figure 4:
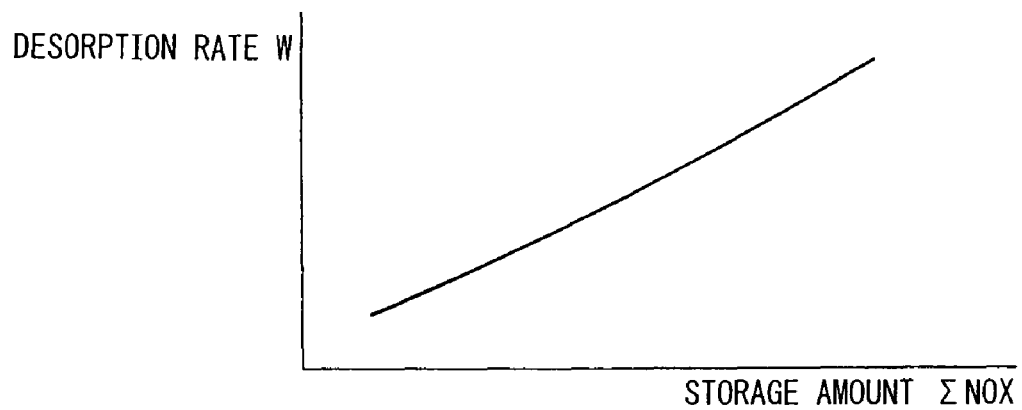
FIG. 4 is a view showing an $NO_x$ desorption rate etc.
Figure 4:
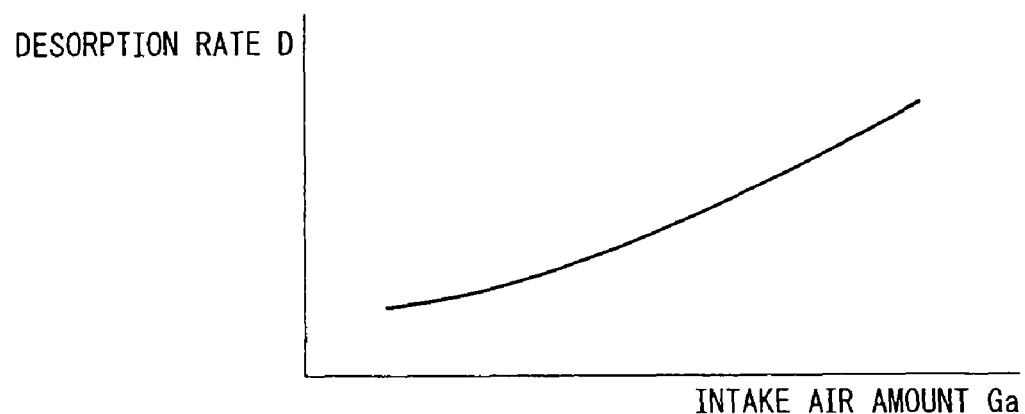

Next, one embodiment of the method of feeding urea according to the present invention will be explained with reference to FIG. 3 to FIG. 5.

In the above way, the $NO_x$ exhausted from the engine is determined in accordance with the engine operating state. In the embodiment according to the present invention, the $NO_x$ amount NOXA exhausted from the engine per unit time is stored as a function of the required torque TQ and engine speed N in the form of the map shown in FIG. 3(A) in advance in the ROM 32.

On the other hand, the storage rate of the $NO_x$ stored at the $NO_x$ storage catalyst 12 in the $NO_x$ exhausted from the engine becomes a function of the $NO_x$ storage amount $\Sigma NOX$ stored at the $NO_x$ storage catalyst 12 and the spatial velocity of the flow of exhaust gas in the $NO_x$ storage catalyst 12. That is, as shown by K1 in FIG. 3(B), the storage rate is reduced the greater the $NO_x$ storage amount $\Sigma NOX$ stored in the $NO_x$ storage catalyst 12, while as shown by K2 in FIG. 3(C), the storage rate is reduced the greater the spatial velocity of the flow of exhaust gas in the $NO_x$ storage catalyst 12, that is, the intake air amount Ga. These storage rates K1 and K2 are stored in advance in the ROM 32. In the embodiment according to the present invention, the exhaust $NO_x$ amount NOXA from the engine is multiplied with the storage rates K1 and K2 to calculate the $NO_x$ amount NOXA·K1·K2 stored in the $NO_x$ storage catalyst 12 per unit time.

Now, the excess $NO_x$ storage amount $\Delta NX$ in FIG. 2 is not released all at once. It is gradually released by a rate in accordance with the $NO_x$ storage amount $\Sigma NOX$ at the $NO_x$ storage catalyst 12 and the spatial velocity of the exhaust gas in $NO_x$ storage catalyst 12, that is, the intake air amount Ga. That is, as shown in FIG. 4(A), the $NO_x$ desorption rate W at a certain intake air amount Ga, that is, the $NO_x$ amount W released from the $NO_x$ storage catalyst 12 per unit time, becomes higher the greater the $NO_x$ storage amount $\Sigma NOX$. That is, the larger the $NO_x$ storage amount $\Sigma NOX$, the larger the amount of $NO_x$ released.

On the other hand, the desorption rate D of $NO_x$ desorbed from the $NO_x$ storage catalyst 12, as shown in FIG. 4(B), becomes higher the greater the intake air amount Ga. In this case, the actual $NO_x$ desorption rate, that is, the amount of $NO_x$ actually desorbed from the $NO_x$ storage catalyst 12 per unit time, becomes the value W·D obtained by multiplying the desorption rate W shown in FIG. 4(A) with the desorption rate D shown in FIG. 5(B). Note that these desorption rate W and desorption rate D are stored in advance in the ROM 32.

When the bed temperature TC gradually rises from the point A of FIG. 2, the $NO_x$ storage amount $\Sigma NOX$ is reduced along with the maximum $NO_x$ storage amount NMAX. $NO_x$ is released a little at a time. However, if in this way the amount of release of $NO_x$ is small, accurate calculation of the aqueous urea solution required for reducing this small amount of $NO_x$ is difficult as a practical problem. Therefore, in the present invention, the $NO_x$ storage catalyst 12 is forcibly raised in temperature so that $NO_x$ is released in a respectable amount in a short time. If the $NO_x$ is released in a respectable amount, the amount of release of $NO_x$ per unit time increases and as a result the amount of feed of the aqueous urea solution required for reducing the $NO_x$ released can be accurately calculated.

Figure 5:
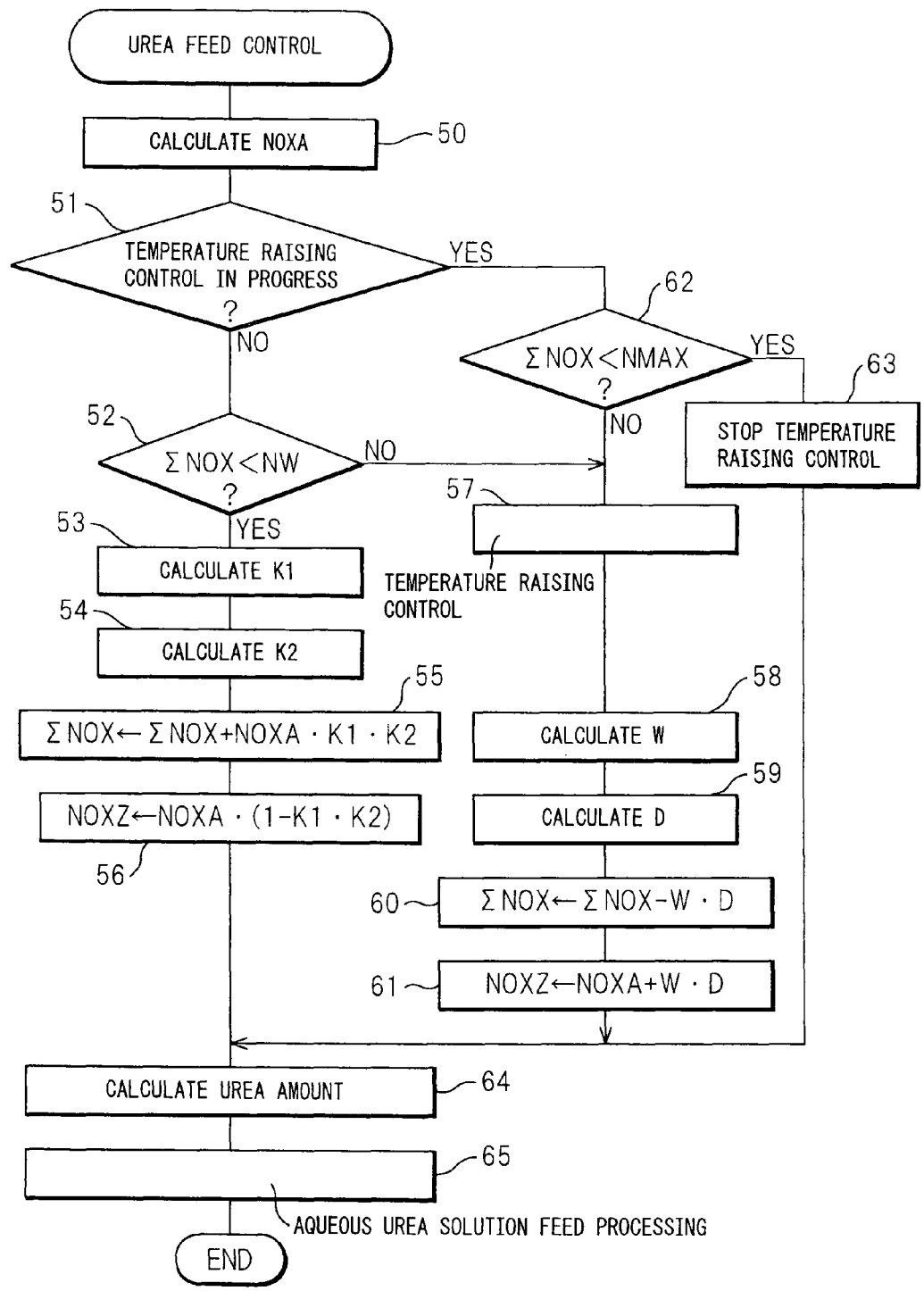
FIG. 5 is a flowchart for feed control of urea.

FIG. 5 shows the routine for control of the feed of urea. Note that this routine is executed by interruption every predetermined time interval.

Referring to FIG. 5, first, at step 50, the exhaust $NO_x$ amount NOXA from the engine per unit time is calculated from the map shown in FIG. 3(A). Next, at step 51, it is judged if the temperature raising control of the $NO_x$ storage catalyst 12 is in progress. When the temperature raising control of the $NO_x$ storage catalyst 12 is not in progress, the routine proceeds to step 52 where it is judged if the $NO_x$ amount $\Sigma NOX$ stored in the $NO_x$ storage catalyst 12 is smaller than the allowable value NW shown in FIG. 2. When $\Sigma NOX<NW$, that is, when there is room for storing the $NO_x$, the routine proceeds to step 53.

At step 53, the storage rate K1 is calculated from the relationship shown in FIG. 3(B), next, at step 54, the storage rate K2 is calculated from the relationship shown in FIG. 3(C). Next, at step 55, the $NO_x$ amount NOXA·K1·K2 actually stored in the $NO_x$ storage catalyst 12 per unit time is added to $\Sigma NOX$ to calculate the $NO_x$ storage amount $\Sigma NOX$. Next, at step 56, the $NO_x$ amount NOXA·K1·K2 actually stored per unit time is subtracted from the exhaust $NO_x$ amount NOXA so as to calculate the $NO_x$ amount NOXZ in the exhaust gas flowing out from the $NO_x$ storage catalyst 12 per unit time.

Next, at step 64, the $NO_x$ in the exhaust gas flowing out from the $NO_x$ storage catalyst 12, that is, the amount of urea required for reducing the $NO_x$ in the exhaust gas flowing into the $NO_x$ selective reduction catalyst 14, is calculated. In the embodiment according to the present invention, this urea amount is made the amount giving an equivalent ratio=1 with respect to the $NO_x$ amount to be reduced. Next, at step 65, the action of feeding the aqueous urea solution from the aqueous urea solution feed valve 15 is performed.

On the other hand, when it is judged at step 52 that $\Sigma NOX \geq NW$, the routine proceeds to step 57 where temperature raising control of the $NO_x$ storage catalyst 12 is performed. This temperature raising control is for example performed by retarding the fuel injection timing and raising the exhaust gas temperature under a lean air-fuel ratio. Next, at step 58, the desorption rate W is calculated from the relationship shown in FIG. 4(A), next, at step 59, the desorption rate D is calculated from the relationship shown in FIG. 4(B). Next, at step 60, the $NO_x$ storage amount $\Sigma NOX$ is calculated by subtracting the $NO_x$ amount W·D actually desorbed per unit time from $\Sigma NOX$. Next, at step 61, the $NO_x$ amount NOXZ in the exhaust gas flowing out from the $NO_x$ storage catalyst 12 per unit time is calculated by adding the $NO_x$ amount W·D actually desorbed per unit time to the $NO_x$ amount NOXA exhausted. Next, at step 64, the urea amount required for reducing this $NO_x$ is calculated.

In this way, in the embodiment according to the present invention, the stored $NO_x$ amount NOXA·K1·K2 is subtracted from the $NO_x$ amount NOXA exhausted from the engine or the released $NO_x$ amount W·D is added to the $NO_x$ amount NOXA exhausted from the engine so as to calculate the $NO_x$ amount NOXZ in the exhaust gas flowing out from the $NO_x$ storage catalyst 12. The amount of urea feed is calculated from this $NO_x$ amount NOXZ.

On the other hand, when it is judged at step 51 that temperature raising control is in progress, the routine proceeds to step 62 where it is judged whether the $NO_x$ amount $\Sigma NOX$ stored in the $NO_x$ storage catalyst 12 has become smaller than the maximum $NO_x$ adsorption amount NMAX shown in FIG. 2. When $\Sigma NOX \geq MAX$, the routine proceeds to step 57 where the temperature raising control is continued. As opposed to this, when $\Sigma NOX < NMAX$, the routine proceeds to step 63 where the temperature raising control is stopped.

Figure 6:
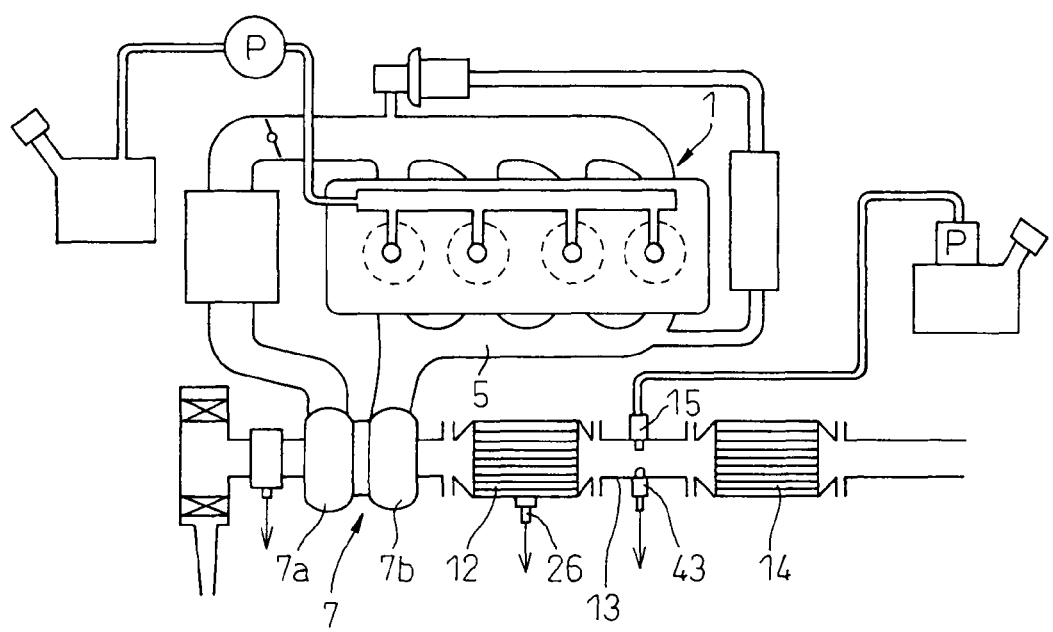
FIG. 6 is an overview showing another embodiment of a compression ignition type internal combustion engine.

FIG. 6 shows another embodiment. In this embodiment, inside the exhaust pipe 13, an $NO_x$ sensor 43 is arranged for detecting the $NO_x$ concentration in the exhaust gas flowing into the $NO_x$ selective reduction catalyst 14. Based on the output signal of this $NO_x$ sensor 43, the feed amount of the aqueous urea solution is controlled. In this embodiment, the $NO_x$ to be reduced in the $NO_x$ selective reduction catalyst 14 is directly measured, so the feed amount of the aqueous urea solution required for reducing the $NO_x$ can be accurately calculated.

Figure 7:
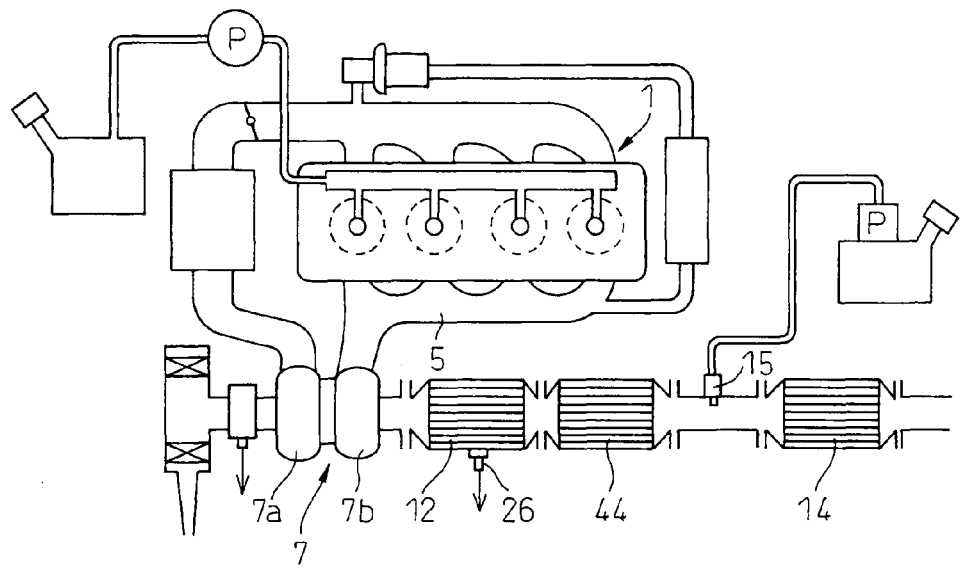
FIG. 7 is a view showing still another embodiment of a compression ignition type internal combustion engine.
Figure 7:
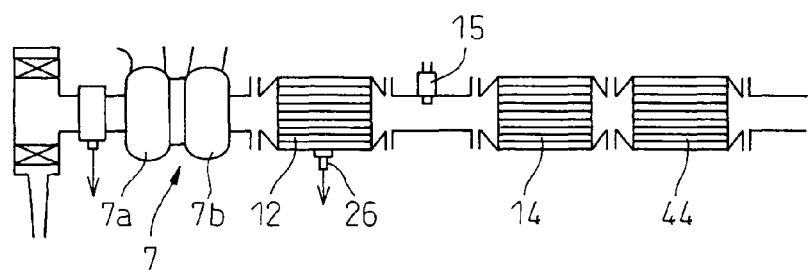
Figure 7:
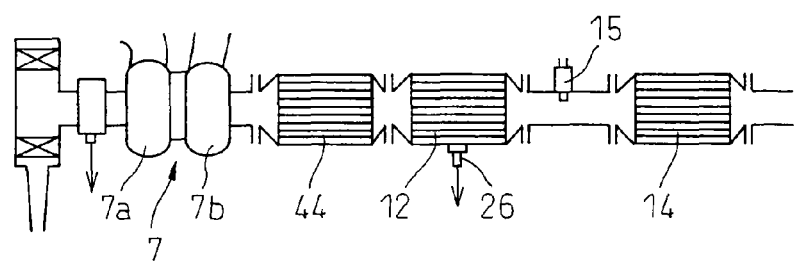

FIGS. 7(A), (B), and (C) show separate embodiments arranging a particulate filter 44 for trapping particulate included in exhaust gas in the engine exhaust passage. In the embodiment shown in FIG. 7(A), the particulate filter 44 is arranged downstream of the $NO_x$ storage catalyst 12, in the embodiment shown in FIG. 7(B), the particulate filter 44 is arranged downstream of the $NO_x$ selective reduction catalyst 14, and in the embodiment shown in FIG. 7(C), the particulate filter 44 is arranged upstream of the $NO_x$ storage catalyst 12.

In these embodiments, together with the temperature raising action of the $NO_x$ storage catalyst 12, the particulate filter 44 is raised in temperature and thereby the particulate deposited on the particulate filter 44 is burned.

LIST OF REFERENCE NUMERALS

4 . . . intake manifold
5 . . . exhaust manifold
7 . . . exhaust turbocharger
12 . . . $NO_x$ storage catalyst
14 . . . $NO_x$ selective reduction catalyst
15 . . . aqueous urea solution feed valve

The invention claimed is:

1. An internal combustion engine exhaust purification device, comprising:
   an $NO_x$ selective reduction catalyst, a urea feed device, an $NO_x$ storage catalyst, an engine exhaust passage, and an electronic control unit,
   wherein the $NO_x$ storage catalyst and the $NO_x$ selective reduction catalyst are inside the engine exhaust passage and the $NO_x$ storage catalyst is upstream of the $NO_x$ selective reduction catalyst,
   wherein the $NO_x$ storage catalyst stores $NO_x$ present in an exhaust gas passing through the engine exhaust passage and releases stored $NO_x$ responsive to temperature,
   wherein the electronic control unit includes operative logic configured to (i) calculate an amount of $NO_x$ stored in the $NO_x$ storage catalyst and an amount of $NO_x$ released from the $NO_x$ storage catalyst, (ii) calculate an amount of the $NO_x$ in the exhaust gas passing from the $NO_x$ storage catalyst into the $NO_x$ selective reduction catalyst by subtracting the calculated stored $NO_x$ amount from an amount of the $NO_x$ in the engine exhaust upstream from the $NO_x$ storage catalyst and by adding the calculated released $NO_x$ amount to the $NO_x$ amount in the engine exhaust upstream from the $NO_x$ storage catalyst, (iii) forcibly raise a temperature of the $NO_x$ storage catalyst to cause the $NO_x$ storage catalyst to release stored $NO_x$ when a calculated stored $NO_x$ amount exceeds a predetermined allowable value, and (iv) feed an amount of urea necessary to reduce the $NO_x$ flowing into the $NO_x$ selective reduction catalyst.

2. The internal combustion engine exhaust purification device of claim 1, wherein the electronic control unit feeds an amount of urea necessary to exactly reduce the $NO_x$ flowing into the $NO_x$ selective reduction catalyst.

3. The internal combustion engine exhaust purification device of claim 1, wherein an amount of the $NO_x$ in the exhaust gas flowing from the $NO_x$ storage catalyst is calculated by subtracting the calculated stored $NO_x$ amount from an amount of the $NO_x$ in the engine exhaust upstream from the $NO_x$ storage catalyst or an amount of the $NO_x$ in the engine exhaust gas is calculated by adding the calculated released $NO_x$ amount to the $NO_x$ amount in the engine exhaust upstream from the $NO_x$ storage catalyst, and the amount of the urea feed is calculated from the amount of the $NO_x$ in the exhaust gas flowing from the $NO_x$ storage catalyst.

4. The internal combustion engine exhaust purification device of claim 1, wherein the $NO_x$ storage catalyst is capable of releasing $NO_x$ in the absence of a reducing agent fed to the $NO_x$ engine exhaust passage upstream of the $NO_x$ storage catalyst.

5. The internal combustion engine exhaust purification device of claim 1, further comprising:
   a particulate filter present in the engine exhaust passage, wherein the electronic control unit includes operative logic capable of raising a temperature of the particulate filter in response to the temperature of the $NO_x$ storage catalyst to thereby burn a particulate deposited on the particulate filter.

6. The internal combustion engine exhaust purification device of claim 1, further comprising:
an exhaust gas recirculation passage connecting an exhaust manifold of the internal combustion engine with an intake manifold of the internal combustion engine upstream of the $NO_x$ storage catalyst.

7. The internal combustion engine exhaust purification device of claim 6, wherein the exhaust gas recirculation passage includes an electronic control valve to control an amount of exhaust gas passing from the exhaust manifold into the intake manifold.

8. The internal combustion engine exhaust purification device of claim 1, further comprising:
a urea feed valve upstream of the $NO_x$ selective reduction catalyst and downstream of the $NO_x$ storage catalyst, wherein the urea feed valve is capable of feeding urea into the $NO_x$ engine exhaust passage.

9. The internal combustion engine exhaust purification device of claim 8, further comprising:
a urea solution tank connected to a feed pump which is connected to the urea feed valve.

10. The internal combustion engine exhaust purification device of claim 1, wherein the electronic control unit is configured to control the amount of the urea by controlling a urea feed valve.

11. The internal combustion engine exhaust purification device of claim 1, wherein the electronic control unit comprises a temperature sensor located in the $NO_x$ storage catalyst and a detector to measure an amount of intake air.

12. The internal combustion engine exhaust purification device of claim 1, wherein the $NO_x$ storage catalyst comprises a precious metal in combination with at least one selected from the group consisting of an alkali metal, an alkaline earth metal, and a rare earth metal.

13. The internal combustion engine exhaust purification device of claim 1, wherein the electronic control unit includes operative logic to control the amount of the urea fed into the $NO_x$ exhaust passage according to a difference in the amount of $NO_x$ upstream from the $NO_x$ storage catalyst and the amount of $NO_x$ present in the engine exhaust downstream from the $NO_x$ storage catalyst.

* * * * *